(12) United States Patent
Charron et al.

(10) Patent No.: US 10,221,809 B2
(45) Date of Patent: Mar. 5, 2019

(54) THRUST REVERSER SLIDING DOOR ASSEMBLY

(71) Applicant: United Technologies Corporation, Hartford, CT (US)

(72) Inventors: Mike Charron, Baltic, CT (US); Robert L. Gukeisen, Middletown, CT (US)

(73) Assignee: United Technologies Corporation, Farmington, CT (US)

(*) Notice: Subject to any disclaimer, the term of this patent is extended or adjusted under 35 U.S.C. 154(b) by 368 days.

(21) Appl. No.: 14/911,118

(22) PCT Filed: Aug. 14, 2014

(86) PCT No.: PCT/US2014/051003
§ 371 (c)(1),
(2) Date: Feb. 9, 2016

(87) PCT Pub. No.: WO2015/069350
PCT Pub. Date: May 14, 2015

(65) Prior Publication Data
US 2016/0201600 A1 Jul. 14, 2016

Related U.S. Application Data

(60) Provisional application No. 61/870,829, filed on Aug. 28, 2013.

(51) Int. Cl.
*F02K 1/72* (2006.01)
*B64D 29/06* (2006.01)
(Continued)

(52) U.S. Cl.
CPC .............. *F02K 1/605* (2013.01); *B64D 29/00* (2013.01); *B64D 29/06* (2013.01); *F02K 1/72* (2013.01);
(Continued)

(58) Field of Classification Search
CPC ... F02K 1/30; F02K 1/605; F02K 1/72; B64D 29/00; B64D 29/02; B64D 29/06; B64D 29/08
See application file for complete search history.

(56) References Cited

U.S. PATENT DOCUMENTS

| 4,183,478 A | 1/1980 | Rudolph |
| 5,083,426 A | 1/1992 | Layland |

(Continued)

FOREIGN PATENT DOCUMENTS

| WO | WO2008045062 A1 | 4/2008 |
| WO | 2012140368 A1 | 10/2012 |

OTHER PUBLICATIONS

Extended European Search Report for European Patent Application No. 14860314.5, dated Apr. 19, 2017, 7 pages.

(Continued)

*Primary Examiner* — Scott J Walthour
(74) *Attorney, Agent, or Firm* — Kinney & Lange, P.A.

(57) ABSTRACT

A gas turbine engine assembly has a pylon with a first side and a second side. A first rail is mounted to the first side and a second rail is mounted to the second side. The assembly also has a thrust reverser with a first door assembly with a first upper portion and a first lower portion, and a second door assembly with a second upper portion and a second lower portion. A plurality of fasteners is part of the assembly. The first upper portion is connected with at least one of the plurality of fasteners to the first rail, and the second upper portion is connected with at least one of the plurality of fasteners to the second rail such that the thrust reverser is positionable between an engaged position and a disengaged position.

11 Claims, 7 Drawing Sheets

(51) Int. Cl.
  *F02K 1/60* (2006.01)
  *B64D 29/00* (2006.01)
  *B64D 29/02* (2006.01)

(52) U.S. Cl.
  CPC .......... *B64D 29/02* (2013.01); *F05D 2230/70* (2013.01); *F05D 2230/72* (2013.01); *F05D 2230/80* (2013.01); *F05D 2260/50* (2013.01)

(56) References Cited

U.S. PATENT DOCUMENTS

| | | |
|---|---|---|
| 5,097,661 A | 3/1992 | Lair et al. |
| 5,915,765 A * | 6/1999 | Sternberger ........... B64D 29/06 24/270 |
| 6,340,135 B1 | 1/2002 | Barton |
| 6,568,172 B2 | 5/2003 | Jannetta et al. |
| 6,584,763 B2 | 7/2003 | Lymons et al. |
| 7,104,500 B1 | 9/2006 | Smith |
| 8,136,341 B2 | 3/2012 | Stephan et al. |
| 2003/0159429 A1 | 8/2003 | Langston et al. |
| 2008/0315034 A1* | 12/2008 | Vauchel ................. B64D 29/08 244/54 |
| 2010/0107599 A1 | 5/2010 | Vauchel |
| 2010/0270428 A1 | 10/2010 | Murphy |
| 2011/0167790 A1 | 7/2011 | Cloft et al. |
| 2012/0124963 A1* | 5/2012 | Howe ..................... A63F 13/12 60/204 |
| 2013/0062435 A1 | 3/2013 | Moradell-Casellas |
| 2013/0075492 A1 | 3/2013 | Welch et al. |

OTHER PUBLICATIONS

The International Search Report dated May 28, 2015 for International Application No. PCT/US2014/051003.

* cited by examiner

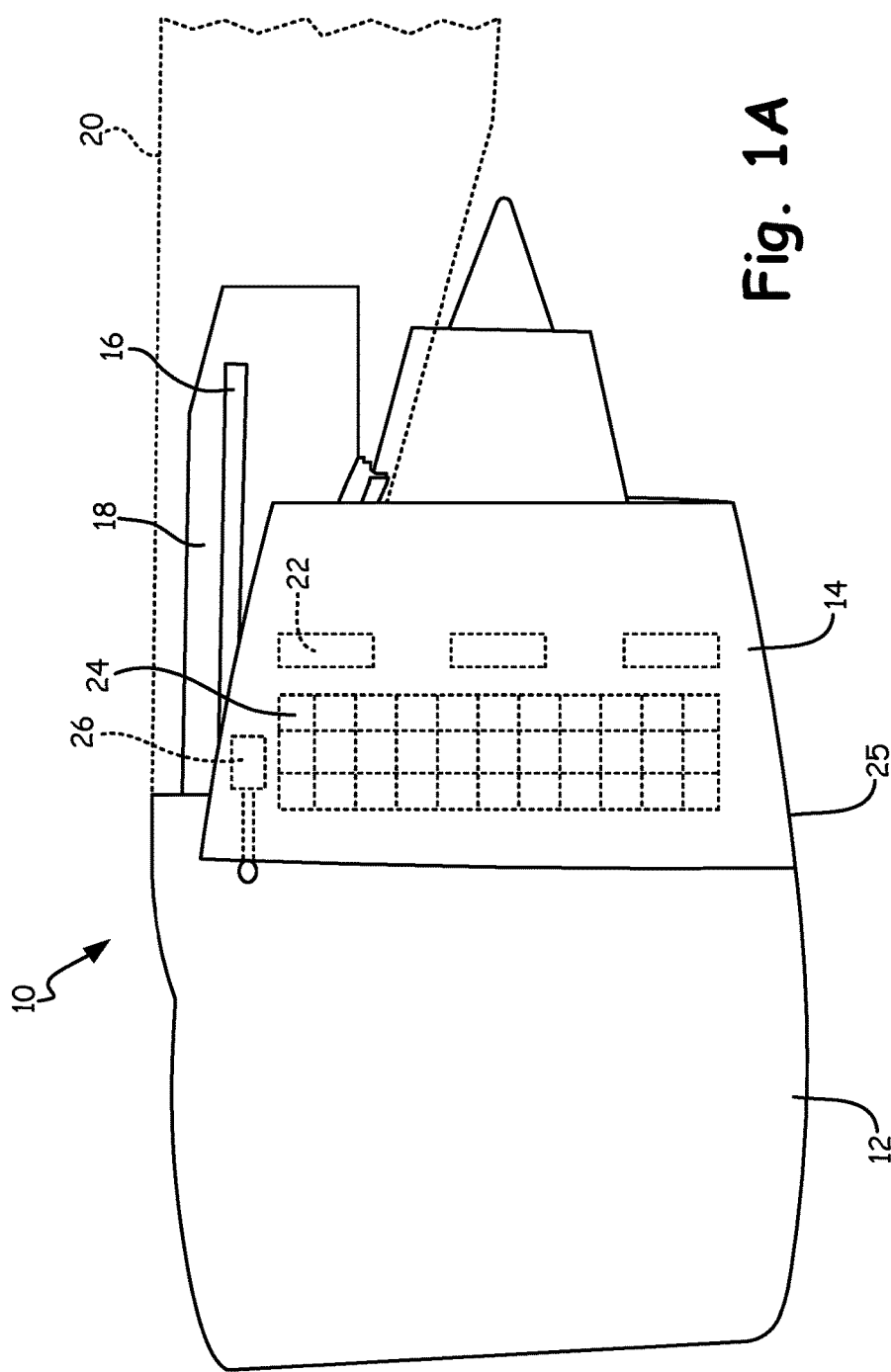

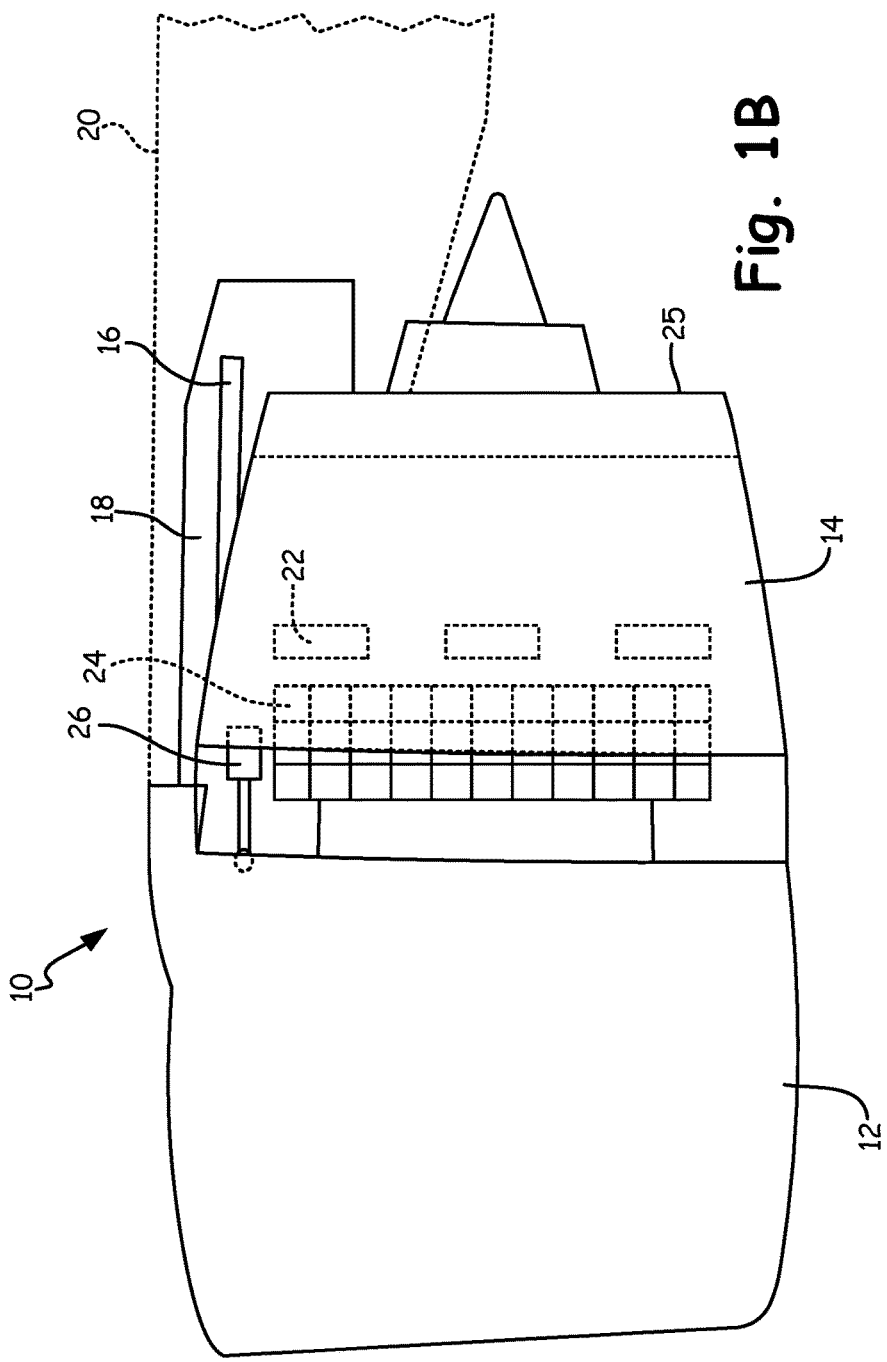

THRUST REVERSER SLIDING DOOR ASSEMBLY

CROSS-REFERENCE TO RELATED APPLICATION(S)

This application claims the benefit of PCT application PCT/US2014/051003, filed Aug. 14, 2014, for "THRUST REVERSER SLIDING DOOR ASSEMBLY", by Mike Charron, and Robert L. Gukeisen, and U.S. Provisional Application No. 61/870,829, filed Aug. 28, 2013, for "THRUST REVERSER SLIDING DOOR ASSEMBLY", by Mike Charron, and Robert L. Gukeisen.

BACKGROUND

The present disclosure relates to gas turbine engines, and more specifically to a sliding thrust reverser for a gas turbine engine.

Gas turbine engines may include a thrust reverser in which a translatable sleeve forms a rearward, outer wall portion of a bypass duct. The thrust reverser is for reversing thrust upon landing of an aircraft to enhance its stopping capability. For normal air flow through the bypass duct, the translatable sleeve resides in a closed position. For thrust reverse air flow, the translatable sleeve is translated rearward to form an outlet defined by a fixed cascade array which forms a series of fixed, curved deflector blades.

A number of blocking doors are pivotally mounted on the translatable sleeve and coupled by linkages to the core cowl of the engine. When the translatable sleeve moves rearward upon deployment, the linkages pivot the blocking doors radially inwardly to block the bypass duct and redirect the air flow from the bypass duct through the cascade array in an outwardly and forwardly direction.

Thrust reverser doors must be opened periodically for maintenance action. A traditional thrust reverser door is hinged at the top and rotates normal to the engine center line. Frequently on large diameter engines, the door open angle is limited due to interference with the wing. In order to ensure access to core accessories and the propulsion system, the center of gravity is located forward of the wing to enable a greater door open angle.

SUMMARY

A thrust reverser having a plurality of door assemblies that are variable between a first position and a second position is disclosed. The thrust reverser also has a plurality of tracks and a plurality of attachment components connecting the plurality of door assemblies to the plurality of tracks. The attachment components are capable of sliding within the track to move the plurality of door assemblies between the first position and the second position.

In another embodiment, a gas turbine engine assembly has a pylon with a first side and a second side. A first rail is mounted to the first side and a second rail is mounted to the second side. The assembly also has a thrust reverser with a first door assembly with a first upper portion and a first lower portion, and a second door assembly with a second upper portion and a second lower portion. A plurality of fasteners is part of the assembly. The first upper portion is connected with at least one of the plurality of fasteners to the first rail, and the second upper portion is connected with at least one of the plurality of fasteners to the second rail such that the thrust reverser is positionable between an engaged position and a disengaged position.

BRIEF DESCRIPTION OF THE DRAWINGS

FIG. 1A is a side elevation view of a thrust reverser in a stowed postion.

FIG. 1B is a side elevation view of a thrust reverser in a deployed postion.

DETAILED DESCRIPTION

Figure 2:
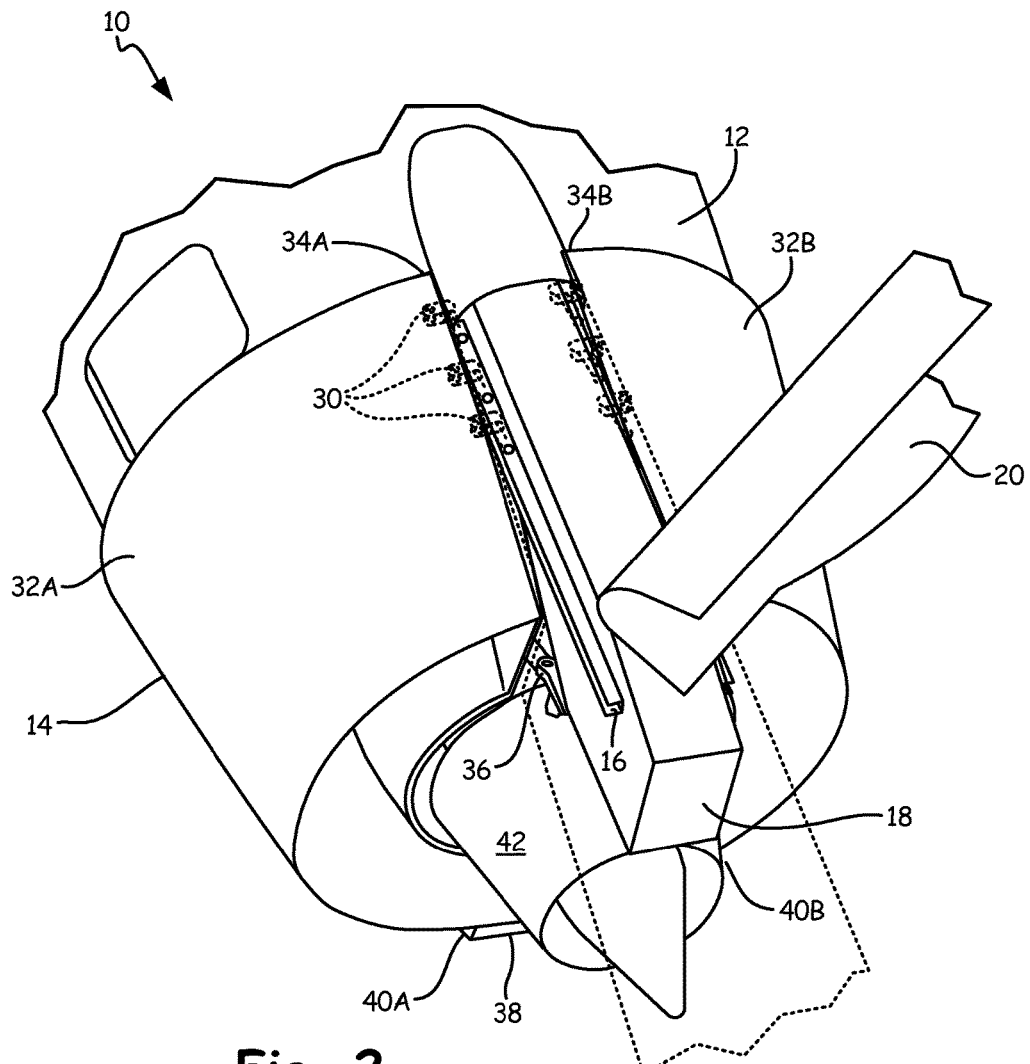
FIG. 2 is a perspective view of the thrust reverser in a first position.

The present disclosure is described with reference to several figures, in each of which like parts are identified and referenced with like numerals and characters. Illustrated in FIGS. 1A and 1B is a side elevation view of gas turbine engine assembly 10, which includes fan nacelle 12, thrust reverser 14, and rails 16 mounted to each side of pylon 18 on wing 20 of an aircraft. Thrust reverser 14 is illustrated in a stowed position in FIG. 1A, and in a deployed position in FIG. 1B. Fan nacelle 12 contains the fan assembly of the turbine engine, and receives ambient air flow during operation of the engine. The fan assembly is powered by the engine core (see FIG. 4). Pylon 18 supports engine assembly 10 through attachment to wing 20 of the aircraft.

Thrust reverser 14 is located aft of fan nacelle 12, and may be a multiple part cascade thrust reverser known in the art. A plurality of thrust reversing deflector doors 22 are typically mounted around the inner perimeter of the cowl of thrust reverser 14, and are deployed to block the fan duct of engine assembly 10 as the cowl is deployed aft. Suitable linear actuators 26 are used to translate the outer shell or door 25 of the cowl between its stowed or retracted position and its deployed or extended position which uncovers a substantially annular outlet for reversing thrust.

The thrust reverser outlet is defined between the forward and aft (retracted and deployed) positions and includes a conventional cascade of turning vanes 24. Cascade vanes 24 are arranged in axially staggered rows and are circumferentially divided into a multitude of cells or small passages through which the bypass fan air is directed radially outwardly by the deflector doors during thrust reversal operation.

FIG. 2 is a perspective view of thrust reverser 14 in an engaged position. As illustrated, thrust reverser 14 is connected to rail 16 on pylon 18 through a plurality of fasteners 30. Thrust reverser 14 has two distinct door assemblies 32A and 32B, each with upper portions 34A and 34B and lower portions 40A and 40B, respectively, secured to rail 16 on pylon 18 with fasteners 30. Door assemblies 32A and 32B are illustrated as C-shaped, may be for a bifurcated cascade thrust reverser known in the art, and may be mirror images of one another about a plane that extends through the center of pylon 18. Door assemblies 32A and 32B may contain cascade vanes 24 (see FIGS. 1A and 1B), an inner shell and a translating door 25 that create a flow path, actuators 26, pivoting blocker doors 22, and other hardware commonly used for thrust reversers.

Disengagement actuator 36 is attached to pylon 18 and door assemblies 32A and 32B, and may provide one or more axes of movement of door assemblies 32A and 32B with respect to pylon 18. Alternately, a plurality of linear actuators may be provided for movement of door assemblies 32A and 32B. Door assemblies 32A and 32B may be secured to each other with a mechanical hinge fastener, such as a hasp 38, at lower portions 40A and 40B. Thrust reverser 14 encases a portion of core engine 42.

As part of the disengaging process, door assemblies 32A and 32B are opened at a small angle and separated from pylon 18, such as less than ten degrees (10°) from one another. Door assemblies 32A and 32B may be rotated about fasteners 30 to create a distance therefrom to pylon 18. The connection between door assemblies 32A and 32B and adjacent components such as pylon 18 and fan nacelle 12 allow for aft translation of thrust reverser 14.

Figure 3:
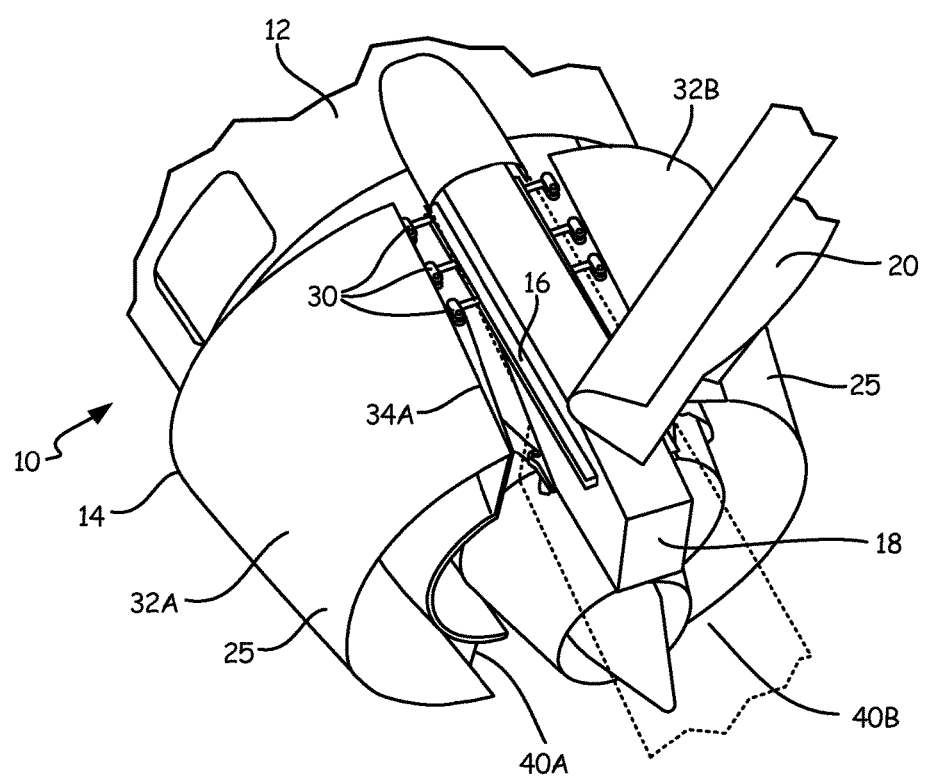
FIG. 3 is a perspective view of the thrust reverser in a second position.

FIG. 3 is a perspective view of thrust reverser 14 in a partially disengaged position. In this view, doors 25 of thrust reverser 14 are in the stowed position, while the entire door assemblies 32A and 32B have been moved. Hasp 38 has been undone, and disengagement actuator 36 has moved each door assembly 32A and 32B linearly away from pylon 18. Fasteners 30 still connect upper portions 34A and 34B to rails 16 on each respective side of pylon 18. Lower portions 40A and 40B of door assemblies 32A and 32B thrust reverser 14 are no longer in contact with one another. As the doors are moved outboard, clearance from other engine components is created to allow for aft translation of thrust reverser 14. The amount of clearance needed is minimal, such as less than 300 mm between either door assembly 32A or 32B and adjacent components.

Figure 4:
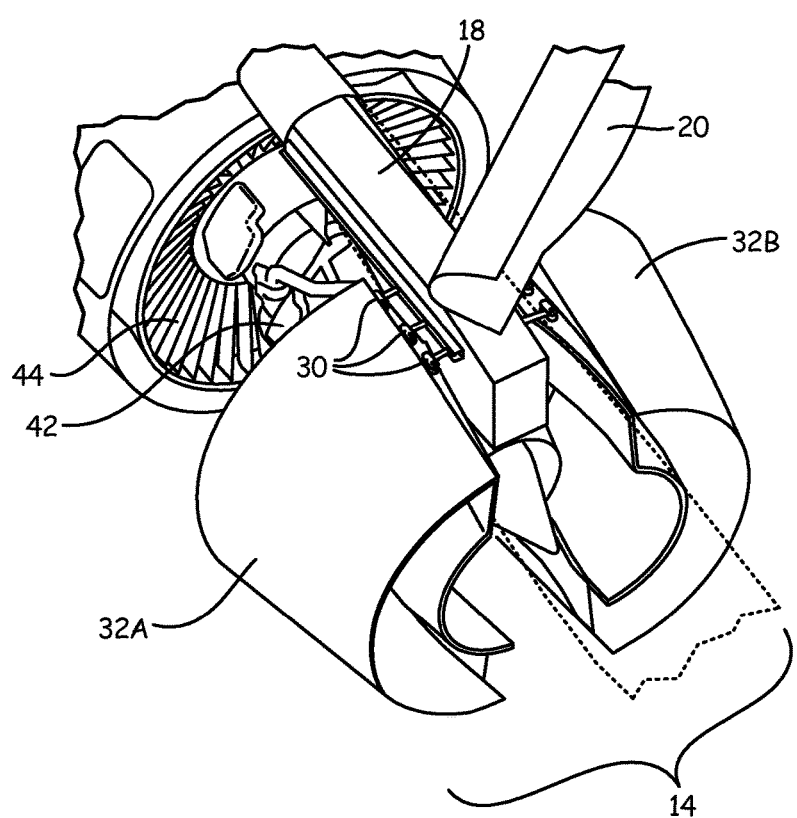
FIG. 4 is a perspective view of the thrust reverser in a third position.

FIG. 4 is a perspective view of thrust reverser 14 in a third position. Door assemblies 32A and 32B have been moved aft, thus exposing engine core 42, associated core accessories, and fan assembly 44. Fasteners 30 have been slid aft along rail 16 resulting in the repositioning of thrust reverser 14. In the disengaged position of thrust reverser 14, access to engine core 42 and fan assembly 44 is accorded for inspection, routine maintenance, or similar tasks. The amount of aft translation of thrust reverser 14 varies on the size of the engine and engine core, and in one example the distance of aft translation is not greater than 2 m.

Figure 5:
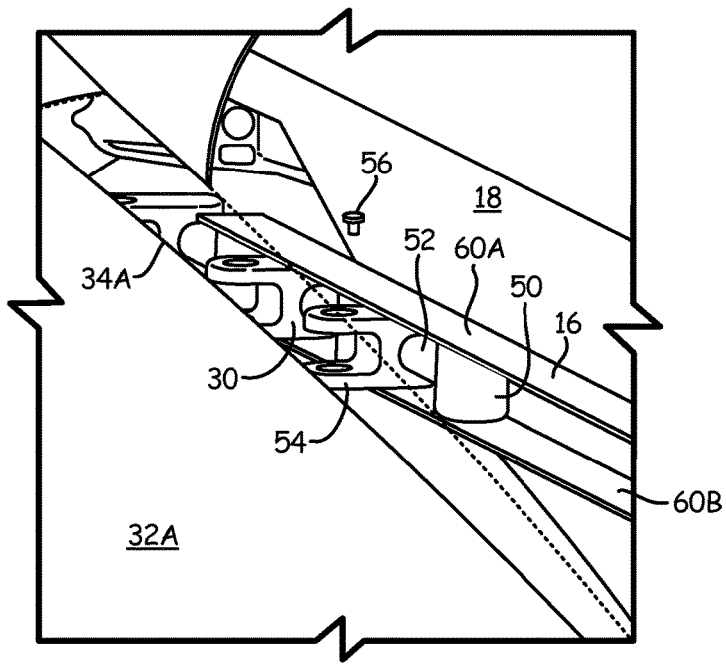
FIG. 5 is a perspective view of a rail and thrust reverser attachment components.
Figure 6:
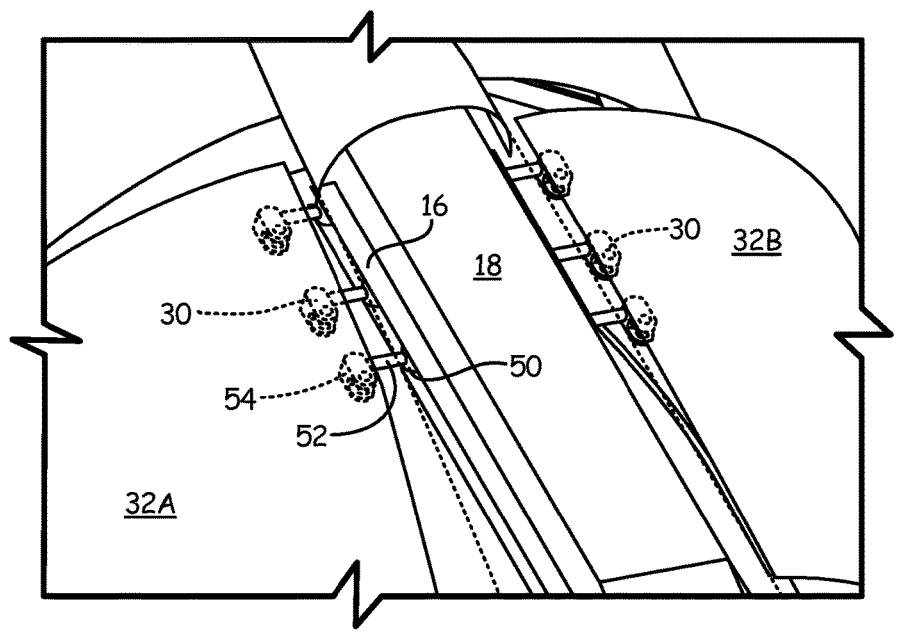
FIG. 6 is a close-up perspective view of the rail and attachment components with the thrust reverser in the second position.

FIG. 5 is a perspective view of one rail 16 and fasteners 30 with thrust reverser 14 in a partially engaged position, and FIG. 6 is a perspective view of rail 16 and fasteners 30 with thrust reverser 14 in a second partially engaged position. Rail 16 and fasteners 30 may be constructed from a high temperature and tensile metal or metal alloy, such as an Inconel nickel alloy or stainless steel. Rail 16 is a guide or track that receives fasteners 30 and permits the linear motion thereof. Rail 16 may be a structural steel component such as a channel iron, tube, or similar structure that receives fasteners 30. The geometry of rail 16 is illustrated as generally rectangular in cross section, although other geometries such as circular, oval, square, and trapezoidal are envisioned. In one embodiment, each rail 16 is constructed from two parallel and identical strips of metal alloy attached to pylon 18, each containing a lip on the end opposite the end attached to pylon 18. Rail 16 is secured to pylon 18, such as by welding or attachment with fasteners such as rivets or bolts. Rail 16 may also contain stops at the fore and aft ends thereof to limit the range of motion of fasteners 30 within rail 16.

Fasteners 30 are attachment components retained in rail 16 when thrust reverser 14 is in the engaged position. As illustrated in FIGS. 5 and 6, fasteners 30 contain head 50, rod 52, clevis 54, and pin 56. Head 50 is a slidable portion of fastener 30 contained within the track created by rail 16. Head 50 may be cylindrical, spherical, or similarly curved in shape to reduce drag when moving fastener 30 within rail 16. Rod 52 is an extension portion of fastener 30 that creates separation between door assembly 32A and rail 16. Rod 52 is sized to be smaller than the distance between upper portion 60A and lower portion 60B of rail 16, thus permitting movement of door assembly 32A with respect to pylon 18. Rod may be of any geometry so long as the cross-section permits movement of fastener 30 with respect to rail 16. Rod 52 may be of either a solid or hollow design.

Clevis 54 is used to attach fastener 30 to door assembly 32A, such as with pin 56. Alternatively, clevis 54 or a corresponding structure may be permanently secured to upper portion 34A by means such as welding. Clevis 54 may be pivotally connected to rod 52, permitting rotation about an axis perpendicular to the axis created by the sliding of fastener 30 within rail 16. Alternatively, clevis 54 is non-pivotally connected to rod 52, and head 50 permits rotation about an axis perpendicular to the axis created by the sliding of fastener 30 within rail 16.

When thrust reverser 14 is in the first (engaged) position, fasteners 30 are contained within rail 16 and upper portion 34A of door assembly 32A (see FIG. 5). Rod 52 is generally parallel to the rail 16, and is contained between upper portion 60A and lower portion 62A thereof. When thrust reverser 14 is in a disengaged position (see FIG. 6), rods 52 permit separation between upper portion 34A of door assembly 32A and pylon 18. Thrust reverser 14 may then be moved aft along rails 16. The movement of thrust reverser 14 is accomplished by either manual or automatic systems. If an automatic system is used, the system (which may include disengagement actuator 36) may be pneumatically, hydraulically, or electrically actuated. As force is applied to separate door assembly 32A from pylon 18, a portion of fastener 30 will pivot to allow rod 52 to rotate to a position that is generally perpendicular to rail 16. Additionally, fasteners 30 may act as hinge mechanisms by allowing for radial movement of door assemblies 32A and 32B about upper portions 34A and 34B through a pivoting connection of clevis 54 of each fastener 30.

Figure 7:
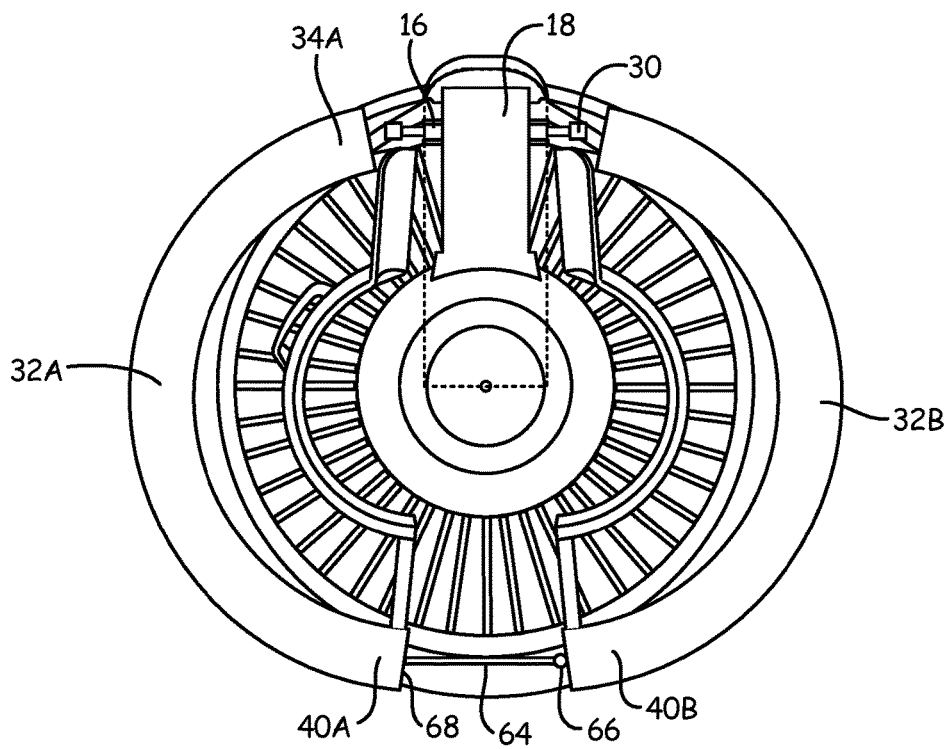
FIG. 7 is a back elevation view of the thrust reverser.

FIG. 7 is a back elevation view of thrust reverser 14 in a disengaged position. Door assemblies 32A and 32B have been extended outward from the engaged attachment with pylon 18. Door assembly 32B contains bracket 64 pivotally connected thereto by hinge mechanism 66 at lower portion 40B. Bracket 64 contains stabilizing end 68 that contacts lower portion 40A of door assembly 32A. In the engaged position of thrust reverser 14, bracket 64 is in a stowed or retracted position within lower portion 40B, and is positioned generally parallel to rails 16. In the disengaged position of thrust reverser 14, bracket is extracted or pivoted to be generally perpendicular to rail 16. Stabilizing end 68 is positioned against lower portion 40A to maintain the positions of door assemblies 32A and 32B with respect to one another.

Figure 8:
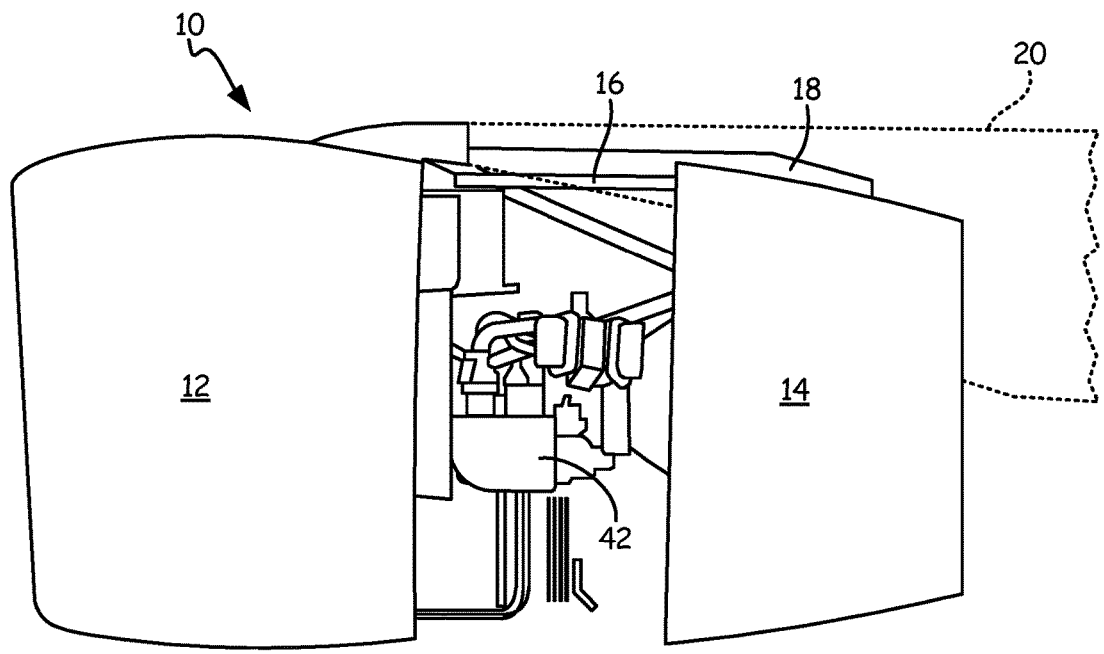
FIG. 8 is a side elevation view of the thrust reverser in an open position.

FIG. 8 is a side elevation view of thrust reverser 14 in the disengaged, or open, position. As previously described, pylon 18 contains rails 16 to provide a slidable engagement between thrust reverser 14 and fan nacelle 12 of gas turbine engine assembly 10. Pylon 18 is attached to wing 20. With thrust reverser 14 in the disengaged position, core engine 42 may be accessed, or even removed from engine assembly 10.

With the aforementioned description, a sliding thrust reverser door is disclosed. The sliding thrust reverser door design eliminates the drawbacks associated with traditional designs that were constrained in door movement due to the location of the engine under the wing of an aircraft. The propulsion system, and center of gravity of the engine, may be moved further aft relative to the wing. This reduces the moment applied to the strut and wing, and allows for design of engines with larger fan assemblies. Greater access to the core with the present disclosure allows for greater ease in performing inspections, routine maintenance, or similar tasks.

Discussion of Possible Embodiments

The following are non-exclusive descriptions of possible embodiments of the present invention.

A thrust reverser having a plurality of door assemblies that are variable between a first position and a second position is disclosed. The thrust reverser also has a plurality of tracks and a plurality of fasteners connecting the plurality of door assemblies to the plurality of tracks. The fasteners are capable of sliding within the track to move the plurality of door assemblies between the first position and the second position.

The thrust reverser of the preceding paragraph can optionally include, additionally and/or alternatively, any one or more of the following features, configurations and/or additional components:

an actuator connected between the plurality of door assemblies;

a hinge between the plurality of door assemblies;

a retractable bracket that secures the plurality of door assemblies with respect to one another in the second position;

wherein each of the plurality of door assemblies contains turning vane cascades; and/or wherein each of the plurality of attachment components include a first portion within the track, a second portion, and a third portion attached to one of the plurality of door assemblies.

In another embodiment, a gas turbine engine assembly has a pylon with a first side and a second side. A first rail is mounted to the first side and a second rail is mounted to the second side. The assembly also has a thrust reverser with a first door assembly with a first upper portion and a first lower portion, and a second door assembly with a second upper portion and a second lower portion. A plurality of fasteners is part of the assembly. The first upper portion is connected with at least one of the plurality of fasteners to the first rail, and the second upper portion is connected with at least one of the plurality of fasteners to the second rail such that the thrust reverser is positionable between an engaged position and a disengaged position.

The gas turbine engine of the preceding paragraph can optionally include, additionally and/or alternatively, any one or more of the following features, configurations and/or additional components:

an actuator connected between the first door assembly and the second door assembly;

a hinge mechanism connecting the first lower portion and the second lower portion;

a hasp securing the first door assembly and the second door assembly;

a bracket pivotally connected to the first lower portion, wherein the bracket contains an engagement end that secures the first lower portion with respect to the second lower portion when the thrust reverser is in the second disengaged position;

wherein the thrust reverser further comprises turning vane cascades;

wherein the first door assembly is C-shaped;

wherein the first door assembly is a mirror image of the second door assembly; and/or wherein the plurality of fasteners each include a slidable portion within the track, a extending portion connected to the first slidable portion, and a pivoting portion attached to the second extending portion, wherein the third pivoting portion is secured to one of the first or second door assemblies.

Although the present invention has been described with reference to preferred embodiments, workers skilled in the art will recognize that changes may be made in form and detail without departing from the spirit and scope of the invention.

The invention claimed is:

1. A thrust reverser comprising:
a plurality of door assemblies, each door assembly of the plurality of door assemblies configured to move between a first position and a second position, wherein each door assembly of the plurality of door assemblies includes cascade vanes and a translating outer door;
a plurality of rails; and
a plurality of attachment components, the plurality of attachment components including a first attachment component and a second attachment component, the first attachment component connecting a first door assembly of the plurality of door assemblies to a first rail of the plurality of rails via a first pivoting connection between the first door assembly and the first attachment component and via a first sliding connection between the first attachment component and the first rail, the second attachment component connecting a second door assembly of the plurality of door assemblies to a second rail of the plurality of rails via a second pivoting connection between the second door assembly and the second attachment component and via a second sliding connection between the second attachment component and the second rail;
wherein a portion of the first attachment component is configured to slide within the first rail via the first sliding connection to move the first door assembly between the first position and the second position, a portion of the second attachment component is configured to slide within the second rail via the second sliding connection to move the second door assembly between the first position and the second position, the first attachment component is configured to pivot at the first sliding connection about a first pivot axis perpendicular to a first longitudinal axis defined by the first rail, the first pivoting connection having a second pivot axis perpendicular to the first longitudinal axis and lateral to the first longitudinal axis, the second attachment component is configured to pivot at the second sliding connection about a third pivot axis perpendicular to a second longitudinal axis defined by the second rail, the second pivoting connection having a fourth pivot axis perpendicular to the second longitudinal axis and lateral to the second longitudinal axis.

2. The thrust reverser of claim 1, further comprising: a disengagement actuator attached to the plurality of door assemblies and a pylon.

3. The thrust reverser of claim 1, further comprising a mechanical hinge fastener extending between the first door assembly and the second door assembly.

4. The thrust reverser of claim 1, further comprising a retractable bracket that extends between and secures the first door assembly with respect to the second door assembly in the second position.

5. A gas turbine engine assembly comprising:
   a pylon with a first side and a second side;
   a first rail mounted to the first side and a second rail mounted to the second side;
   a thrust reverser including:
      a first door assembly with a first upper portion and a first lower portion;
      a second door assembly with a second upper portion and a second lower portion; and
      a plurality of fasteners, the plurality of fasteners including at least one first fastener and at least one second fastener;
      wherein the first upper portion is connected to the first rail via a first pivoting connection between the first upper portion and the at least one first fastener and via a first sliding connection between the at least one first fastener and the first rail, and the second upper portion is connected to the second rail via a second pivoting connection between the second upper portion and the at least one second fastener and via a second sliding connection between the at least one second fastener and the second rail,
      wherein a portion of the at least one first fastener is configured to slide within the first rail via the first sliding connection, a portion of the at least one second fastener is configured to slide within the second rail via the second sliding connection, the at least one first fastener is configured to pivot at the first sliding connection about a first pivot axis perpendicular to a first longitudinal axis defined by the first rail, the first pivoting connection having a second pivot axis perpendicular to the first longitudinal axis and lateral to the first longitudinal axis, the at least one second fastener is configured to pivot at the second sliding connection about a third pivot axis perpendicular to a second longitudinal axis defined by the second rail, the second pivoting connection having a fourth pivot axis perpendicular to the second longitudinal axis and lateral to the second longitudinal axis,
      wherein the first door assembly is configured to move laterally via rotation of the at least one first fastener about the first pivot axis and via relative rotation between the first upper portion and the at least one first fastener about the second pivot axis, the second door assembly is configured to move laterally via rotation of the at least one second fastener about the third pivot axis and via relative rotation between the second upper portion and the at least one second fastener about the fourth pivot axis, between an engaged position and a disengaged position, wherein the first upper portion and the second upper portion are positioned closer to the pylon in the engaged position than in the disengaged position.

6. The gas turbine engine assembly of claim 5, further comprising: an actuator connected between the first door assembly and the second door assembly.

7. The gas turbine engine assembly of claim 5, further comprising: a hasp configured to secure the first door assembly to the second door assembly.

8. The gas turbine engine assembly of claim 7, further comprising: a bracket pivotally connected to the first lower portion, wherein the bracket contains an engagement end that secures the first lower portion with respect to the second lower portion when the first door assembly and the second door assembly are in the disengaged position.

9. The gas turbine engine assembly of claim 5, wherein the first door assembly and the second door assembly each include cascade vanes.

10. The gas turbine engine assembly of claim 5, wherein the first door assembly is C-shaped.

11. The gas turbine engine assembly of claim 10, wherein the second door assembly is C-shaped.

* * * * *